United States Patent [19]

Topp

[11] Patent Number: 4,608,896
[45] Date of Patent: Sep. 2, 1986

[54] METHOD OF AND DEVICE FOR THE MECHANICAL DIVISION OF UNITS OF CHEESE

[76] Inventor: Burkhard Topp, Am Buschufer 1, 5840 Schwerte 5, Fed. Rep. of Germany

[21] Appl. No.: 667,013

[22] Filed: Nov. 1, 1984

[30] Foreign Application Priority Data

Nov. 3, 1983 [DE] Fed. Rep. of Germany ....... 3339801

[51] Int. Cl.4 .............................................. B26D 1/03
[52] U.S. Cl. .......................................... 83/431; 83/22; 83/425.3; 83/662; 83/697
[58] Field of Search ................ 83/22, 431, 425.3, 697, 83/662

[56] References Cited

U.S. PATENT DOCUMENTS

| | | |
|---|---|---|
| 884,845 | 4/1908 | Nicklin et al. ..................... 83/431 X |
| 1,768,693 | 7/1930 | Kaskouras . |
| 2,346,282 | 4/1944 | Watts .............................. 83/404.3 X |
| 2,383,814 | 8/1945 | Richardson ........................... 83/697 |
| 3,077,215 | 2/1963 | Kentor .................................. 83/697 |
| 4,072,075 | 2/1978 | Ezaki ................................ 83/431 X |

FOREIGN PATENT DOCUMENTS 941941 11/1963 United Kingdom .

*Primary Examiner*—Donald R. Schran
*Attorney, Agent, or Firm*—Toren, McGeady, Stanger,Goldberg & Kiel

[57] ABSTRACT

To divide a unit of cheese, such as a wheel or block of cheese, into individual pieces of different sizes and shapes, the unit of cheese is placed on a support surface and is moved relative to a cutting device. The cutting device is made up of a network of knife-like blades each with a cutting edge and the blades are arranged to divide the unit of cheese into the desired shaped pieces. The entire unit of cheese is cut up into the individual pieces in a single cutting operation. In the cutting operation, the unit of cheese is placed on a support part movable relative to the cutting device. The support part is subdivided into surface parts each having a shape corresponding to the shape of one of the individual pieces of cheese. the support part is movably mounted on upwardly extending guide elements. The cutting device is held in a stationary position on the guide elements. The support part and the cutting device are replaceably mounted on the guide elements.

9 Claims, 7 Drawing Figures

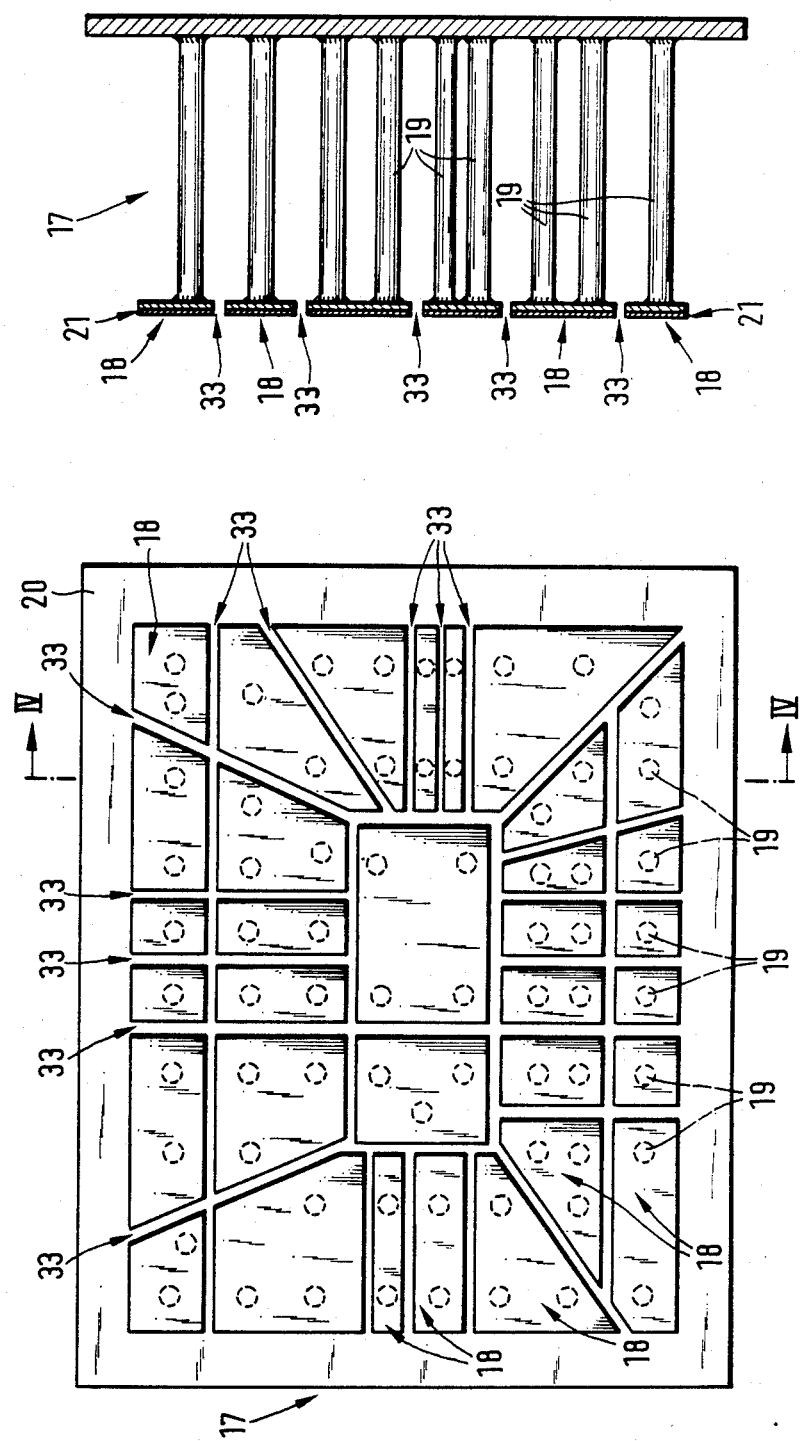

METHOD OF AND DEVICE FOR THE MECHANICAL DIVISION OF UNITS OF CHEESE

SUMMARY OF THE INVENTION

The present invention is directed to a method of and a device for dividing a unit of cheese, such as a wheel or block of cheese, into individual pieces with the size and shape of the individual pieces being determined by the cutting edges on a mechanical dividing device.

Devices for dividing or cutting units of cheese are known. In the past longitudinal or transverse cutting devices have been used as well as devices for dividing round cheese blocks into sector-shaped parts.

In a known longitudinal and transverse cutting device, the cutting wires are tensioned in a frame and the cheese member is divided by pushing it through the cutting wires. A slotted stop interacts with a transverse cutting device equipped with several cutting wires and provided on the opposite side of a conveyor. The slots which align with the cutting wires permit the wires to pass freely through the cheese member, note German Auslegeschrift No. 18 16 008.

In another known device a round section of Roquefort cheese is cut into sector-shaped parts with the aid of steel cutting wires. The device has a round slide movable in the vertical direction for holding the cheese section with a guide and centering device arranged above it. The cutting device made up of a plurality of crossing cutting wires is supported above the guide device. The round cheese section is pressed through the cutting wires during the upward movement of the slide. The slide has diametrically extending, uniformly arranged grooves into which the wires move after completing the upward movement of the slide for separating the wires from the divided cheese pieces, note German Auslegeschrift No. 11 27 657.

Such dividing devices formed of cutting wires have the disadvantage that they can only be used for soft cheeses, such as Roquefort or processed cheese. Moreover, the use of these known cheese dividing devices is limited, because only exactly shaped cheese pieces of round or angular shaped cross-section can be cut. Such devices have been developed for use in cheese factories and particularly for the mass production of uniformly shaped cheese pieces suitable for a packing machine.

For universal use, such as for dividing large units of cheese, such as wheels or blocks of cheese, which often have hard rinds, at department store or supermarket counters, such known cheese dividing devices are not suitable.

When selling cheese, particularly in medium-hard or hard types, such as Gouda, Emmentaler and the like, it is important to maintain the supply of cheese in the undivided condition, since it stays fresh longer due to its protecting rind. In a store, whole units of cheese are usually divided manually. Cutting large and whole units of cheese is a difficult job, especially for the usual female sales personnel. In such cutting operations, hand injuries are not infrequent and injuries often occur which lead to lost time by employees generally due to excessive stress on the wrist and/or tendons in the hand.

Therefore, the primary object of the present invention is to provide a method of and a device for the mechanical division of units of cheese, such as wheels or blocks of cheese, particularly medium hard or hard cheese, where the unit of cheese can be subdivided into different shaped pieces and where the difficulties existing in the prior art are overcome.

In accordance with the present invention, the cutting or dividing device is compact, simple to operate and particularly accident-proof, especially for cutting cheeses enclosed within a hard rind. The device meets the stringent requirements regarding cleanliness and food hygiene and, further, needs little in the way of storage space. An important feature of the invention is the provision of the cutting inserts which can be quickly replaced in a problem-free manner so that the unit of cheese to be cut can be divided into different sized shapes. By means of the present invention, in a single operation a unit of cheese can be divided into a plurality of individual pieces to afford a salable assortment of different sizes and shapes.

In the method of the present invention the cheese is pressed upwardly through the cutting elements in a dividing device.

As a result, sales personnel are relieved of the heavy manual task of cutting the cheese and their time can be directed to the actual selling operation. Moreover, loss of personnel due to injuries or excessive stress on the hands and arms is avoided. In addition, the division of the unit of cheese into a salable assortment affords a positive sales promotion feature directed to the buying public.

In providing a salable assortment of pieces of cheese, a statistical division in size, shape and weight is afforded which best corresponds to the requirements of the purchasing public and, as a consequence, best meets the purchasing public's needs.

A feature of the method provides, after the dividing procedure, that the divided pieces of the unit of cheese are pushed along with their support beyond the cutting elements into a position where the pieces are accessible from all sides.

As a result, the removal of the cut pieces of cheese is facilitated advantageously. Moreover, the procedure of dividing the unit of cheese is visible to the purchasing public in an appealing manner and, consequently, stimulates purchasing interest.

To facilitate the cutting operation in very hard types of cheese, such as Emmentaler, which has a hard rind, the cutting elements are arranged to penetrate the cheese without causing any excessive stress. To afford such a cutting or dividing operation of a whole unit of cheese, the cheese, the cutting elements, or both, are sprayed with a liquid for assisting the cutting operation before commencing the cutting. Preferably, a water-spray mist is used.

A device for dividing a whole unit of cheese, such as a wheel or block of cheese, into individual pieces limited by the cutting edges in a mechanical dividing device, especially for carrying out the method of the invention, is characterized by arranging the cutting elements in the form of knife-like blades positioned within a rigid frame with at least certain of the blades disposed in parallel planes and extending perpendicular to the sides of the frame. The cheese is mounted on a support member divided into individual support parts each having a surface part on which the unit of cheese rests. Each surface part has a peripheral shape corresponding to the shape of one of the pieces of cheese, that is, the surface part has the shape, size and dimensions of one of the pieces of cheese being cut. The adjacent support parts are disposed in closely spaced relation so that interposed slots are located between them. The support parts are held in place by supporting elements extending upwardly from a base plate. Preferably, the base plate is disposed in parallel with the surface parts of the support member.

Accordingly, for the first time, the mechanical division of hard whole units of cheese enclosed by a rind, can be effected in an advantageous manner. With the support parts located on supporting elements it is possible to move the divided pieces of cheese into a position spaced from the cutting elements where the pieces are readily accessible. Furthermore, the arrangement of the support parts with the interposed slots has the advantage that the abrasion of the cheese such as into crumbs, does not take place in the slots as occurs in known cheese cutting devices. This feature facilitates the maintenance of the cleanliness of the device, and the indispensible requirement for cleanliness in the handling of foods can be met without difficulty.

Another characteristic of the device is the provision of a base with rigid, upstanding guide elements on which a vertically movable, horizontally arranged table is guided for mounting the cheese support and its base plate so that they are replaceable. At the upper ends of the guide elements, the frame for the cutting elements is positioned so that it can be quickly replaced. The base plate is inserted in the table using drawer-like slide-in units so that it can be easily and quickly replaced. Since the support and the cutting elements can be quickly replaced, it is possible to clean the various parts of the apparatus and to afford a problem-free changeover of the apparatus into different cutting arrangements for various types of cheese or shapes of the unit of cheese in an optimum manner.

To facilitate the simple and rapid replacement of the cutting elements, in an embodiment of the apparatus the the frame containing the cutting elements is provided with conically shaped bores for engagement with complementary conically shaped sections on the upper ends of the guide elements. The frame can be secured on the guide elements with fastening members such as wedges.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 3 is a plan view of the support divided into support parts each having a surface part and with slots located between adjacent support parts;

FIG. 4 is a sectional view taken along the line IV—IV in FIG. 3;

DETAILED DESCRIPTION OF THE INVENTION

Figure 1A:
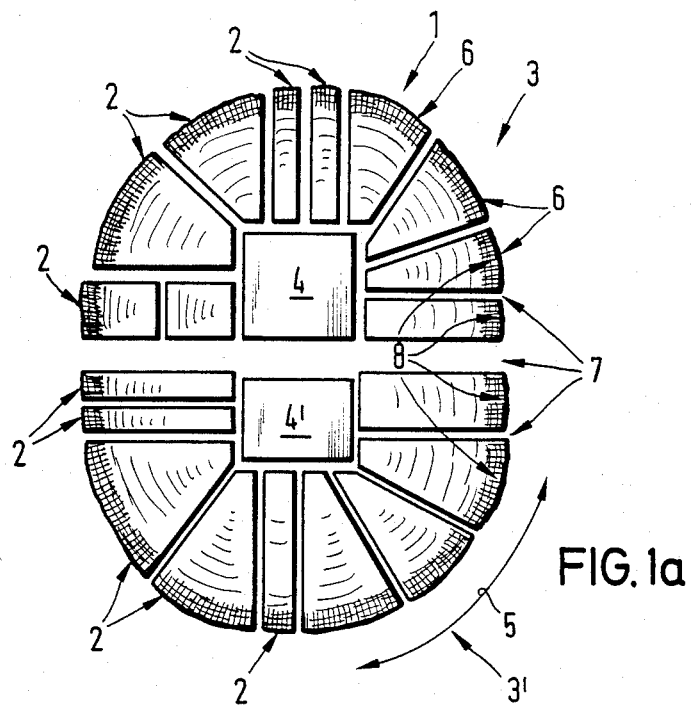
FIG. 1a is a plan view of a whole round unit or wheel of cheese divided into individual pieces in accordance with the present invention.

In FIG. 1a a whole unit of cheese 1, similar to a wheel of cheese, is divided into a multiplicity of individual pieces 2. The cutting lines 7 made in the unit of cheese 1 are arranged so that the unit is divided into two halves 3, 3', each forming approximately one-half of the original unit of cheese 1. Each of the halves 3, 3' includes a rectangularly shaped center piece 4, 4' separated from the remainder of the unit. The part of the unit of cheese 1 located outwardly from the center pieces 4, 4' is divided into sector-shaped pieces 6 by means of cutting lines or cutting elements which extend outwardly from the center pieces 4, 4' to the rind 8 enclosing the unit of cheese 1.

The division of the whole unit of cheese 1 illustrated in FIG. 1a results in 21 individual pieces 2 with the pieces having a different size, a different shape and a different weight. As a result, a salable assortment of individual pieces 2 is provided adapted to the maximum extent to the buying habits of customers, based on experience. If it is necessary to subdivide certain of the pieces 2 in effecting a sale, then the variety of shapes of the individual pieces permits a sales clerk to further subdivide a piece without any difficulty and without involving any time-consuming operations. An important consideration of the manner in which the individual pieces is formed is that each piece has at least two elongated and rectilinear cut edges. With such a shape, the purchaser is able to cut different large pieces at home or to process the piece of cheese 2 with a cheese cutter.

Figure 1B:
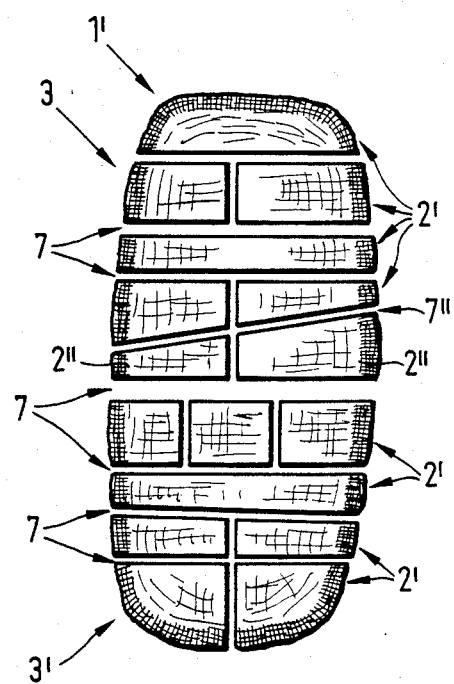
FIG. 1b is a plan view, similar to FIG. 1a where the unit of cheese is an elongated block divided into individual pieces in accordance with the present invention.

In FIG. 1b a different arrangement of cuts is shown in a more block-like unit of cheese 1' so that it is divided into a plurality of different individual pieces 2'. In this arrange- ment, it is also advantageous to separate the unit of cheese 1' into two halves 3, 3'. The unit of cheese 1' in FIG. 1b is different from the type of cheese shown in FIG. 1a and has a different shape as can be noted from the comparison of FIGS. 1a and 1b. In the embodiment exhibited in FIG. 1b, the cutting lines 7 are arranged essentially so that a greater number of angularly shaped individual pieces 2' are formed, certain of which are approximately square with the remainder having a long narrow configuration. One cutting line 7" extends obliquely relative to the long direction of the unit of cheese 1' so that a portion of the unit is cut into four obliquely-angled pieces 2".

The different arrangement of the cutting lines and the different shapes of the whole units of cheese 1, 1', and, in particular, the different types of cheese which can be cut, indicate a significant advantage of the method and the apparatus embodying the present invention. Accordingly, for the first time, a mechanical division or cutting of medium hard and hard whole units of cheese is possible in a retail store utilizing a mechanical dividing apparatus.

By means of the present invention the sales help is relieved from heavy physical work required in the manual cutting of whole units of cheese, with the result that the sales help can devote their time to the actual selling operation. Moreover, a customer can watch the mechanical division of the whole unit of cheese which is interesting and stimulates sales.

Figure 2:
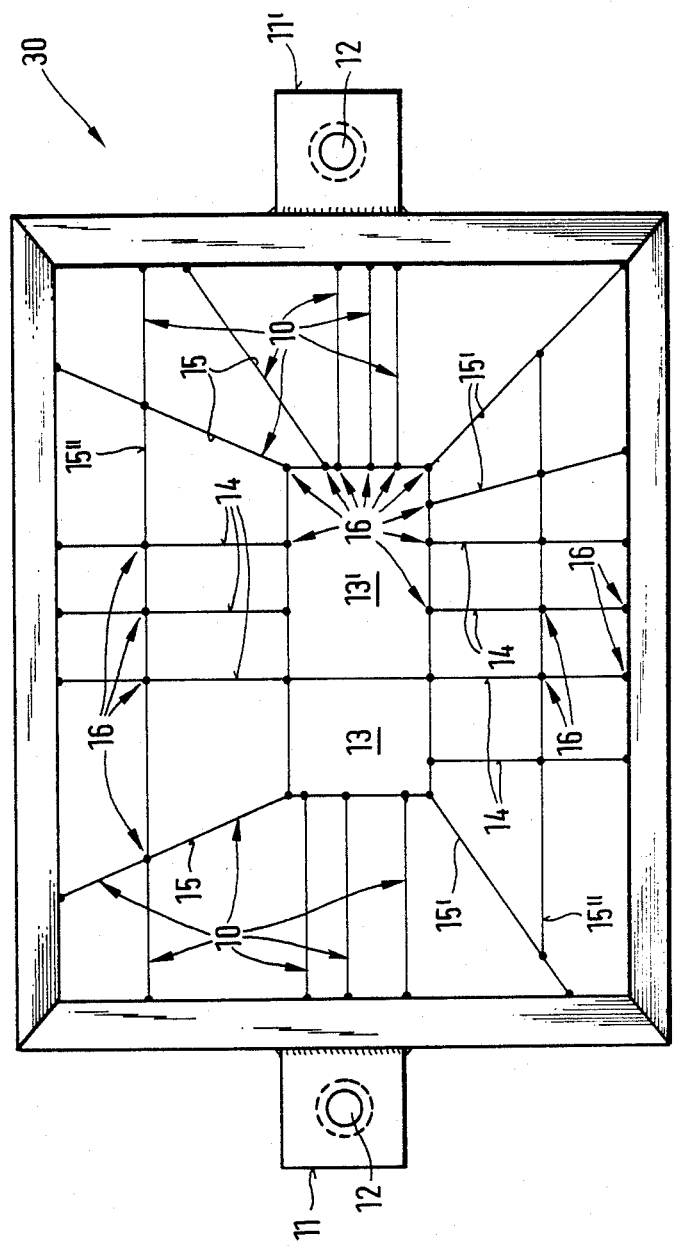
FIG. 2 is a plan view of a portion of the apparatus embodying the present invention illustrating a rigid frame supporting the cutting elements.

In FIG. 2 a plan view is provided of a dividing or cutting element 30. Element 30 includes a frame 9 supporting knife-blades 10 arranged to afford a network of cutting lines. Frame 9 is of a rigid construction, such as hollow box-shaped steel sections welded together. As viewed in FIG. 2, the frame 2 has a pair of longer sides and a pair of shorter sides. A fastening lug 11, 11' is attached to the center point of each of the shorter sides. The fastening lugs are secured to the frame by welds and each lug has a conically shaped recess 12, 12' in the shape of a conically shaped receiving bore. The blades 10 form, according to the type of cheese to be cut, two central rectangles 13, 13'. The cutting blades 14 extend perpendicularly to and outwardly from the rectangles 13, 13', while the blades 15, 15' extend outwardly at oblique angles relative to the sides of the rectangles. Between the sides of the rectangles and the longer sides of the frame 9, blades 15' are provided parallel to the long sides or to the longer axis of the frame. Blades 10', 14, 15, 15' and 15" are connected with one another at a metallic joint 16. Preferably the connection is made in a hard-soldering process, such as a protective gas-hard-soldering process. Accordingly, the connection between the individual blades corresponds approximately to that of the steel forming the blades. This interconnection of the blades for forming the cutting element 30 affords the necessary strength in the overall cutting element necessary for separating a whole unit of cheese 1, 1' enclosed within a hard rind.

In FIGS. 3 and 4 a support member 17 is shown shaped complementary to the cutting element illustrated in FIG. 2. FIG. 3 provides a plan view, while FIG. 4 affords a side view, partly in section, along the line IV—IV in FIG. 3. A support element for the unit of cheese is made up of a number of individual support parts 18 secured to the upper ends of supporting members 19 which are secured at their lower ends to a base plate 20. The base plate 20 is of such a rigid construction that it withstands the forces acting on it during the cutting process without experiencing any apparent bending action. The base plate 20 is a steel plate of adequate stability. It is also possible to form the base plate 20 of fiber reinforced plastics and, in such an embodiment, preferably it is strongly ribbed at its underside to afford stability. Furthermore, the base plate 20 may be constructed as a sandwich member. Regardless of its particular construction, the base plate must be extremely strong as well as relatively light. The supporting members 19 are thin-walled steel tubes and are attached by welding to the base plate 20 and to the individual support parts 18. Alternatively, the base plate, the supporting members, and the support parts may be formed of plastics or plexiglass.

In FIG. 4 the surface parts of the support parts 18 are covered with a coating 21, such as of Teflon. Such a construction is advantageous for food hygiene requirements. As can be noted in FIG. 3, slots 33 are formed between the individual support parts 18 so that the blades 10 of the cutting elements 30, note FIG. 2, can pass through the support element during the cutting or dividing operation.

Figure 5:
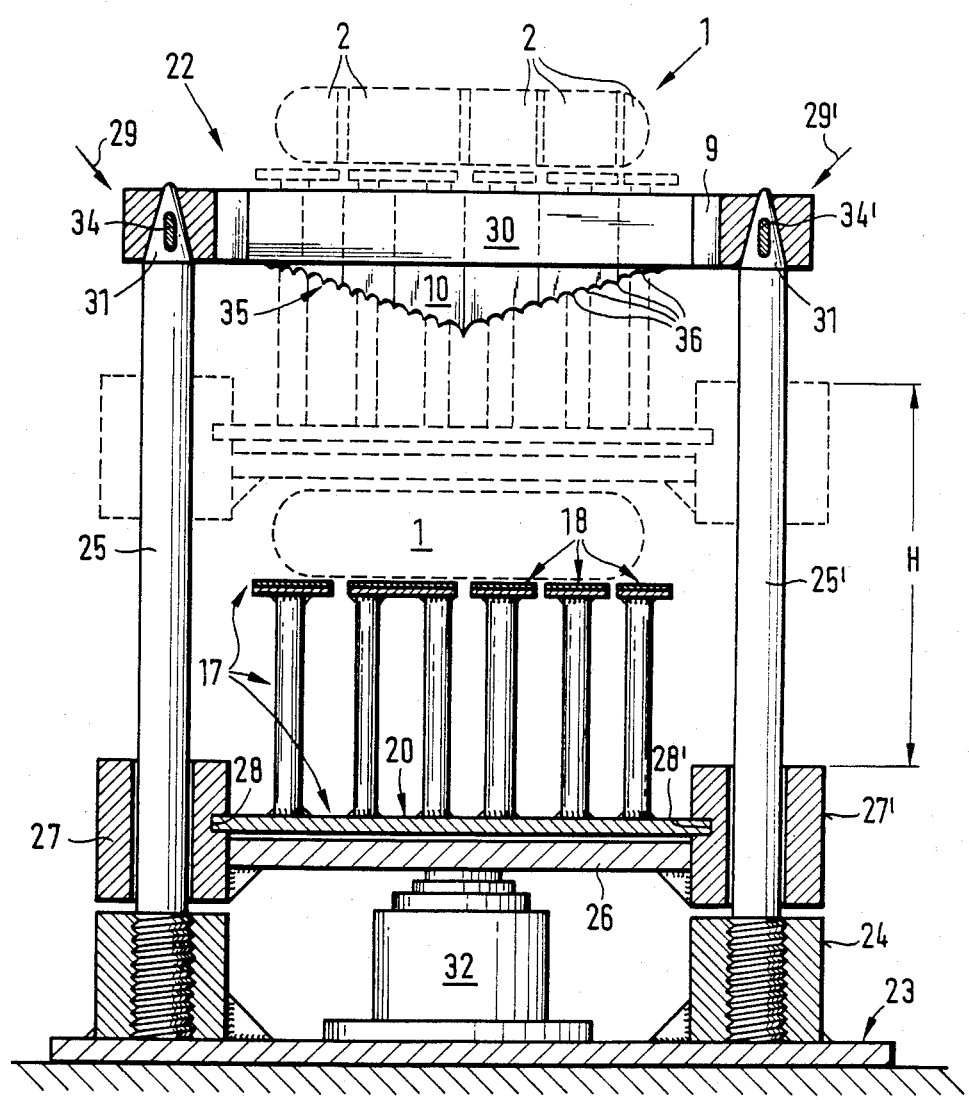
FIG. 5 is a side view, partly in section, of the complete apparatus of the present invention with the support shown in solid line in the lowered position and in broken line in the upper position with the unit of cheese divided into individual pieces.

In FIG. 5 a complete dividing apparatus 22 is illustrated in side view, partly in section. The apparatus has a heavy base plate 23 forming the base structure for the apparatus and threaded bushings 24 are welded to the base plate. Guide members in the form of guide rods 25, 25' are screwed into the bushings 24 so that the guide rods extend upwardly, generally vertically from the base plate 23. A horizontal support table 26 is mounted on the guide rods 25, 25' by means of guide bushings 27, 27' and the table 26 is supported by a hydraulic piston-cylinder unit 32. The hydraulic piston-cylinder unit 32 is shown in the collapsed state and it is arranged to provide a long working stroke H. The guide bushings 27, 27' and the support table 26 have slide-in guides 28, 28' into which the base plate 20 of the support member 17 can be replaceably inserted. With such an arrangement there is the advantage that the support member can be easily replaced when necessary.

The upper ends 29, 29' of the guide elements or guide rods 25, 25' are frusto-conically shaped to afford a quick fastening or release of the cutting element 30. Slots 34, 34' are formed in the guide rods so that a wedge connection can be made between the rods and the cutting element. With this construction an absolutely safe and uncomplicated placement and centering of the cutting elements on the rods can be effected. In such placement, the frame 9 is supported on the upper ends of the guide rods 25, 25' with the ends 29, 29' seated within the conically shaped bores 12 in the fastening lugs 11. Due to the slots 34, 34' arranged to receive wedge connectors, a secure attachment is provided between the frame 9 and the guide rods 25, 25' in a simple manner and in a matter of seconds.

As viewed in FIG. 5, the horizontal support table 26 is shown in full lines in the lower position and a whole unit of cheese 1, shown in dashed lines, is positioned on the surface parts of the support parts 18. Centering of the unit of cheese on the support member is not required nor desired due to the intended uneven division of the cheese into a plurality of differently shaped pieces. To facilitate the positioning of the unit of cheese on the support element, it may be provided with color identification in the form of circles or ellipses, not shown, in the manner of a target, for locating the cheese in place. The upper position of the support member 17, shown in broken line, illustrates the unit of cheese 1 after it has been pressed from the bottom upwardly through the cutting element 30 so that it is divided in a manner such as is shown in FIGS. 1a and 1b. As can be seen in FIG. 5, the upper portion of the support member 17 projects upwardly above the upper plane of the cutting element 30 so that the divided cheese pieces 2 are freely accessible from all sides of the apparatus. This feature considerably facilitates the operation and use of the apparatus.

Figure 6:
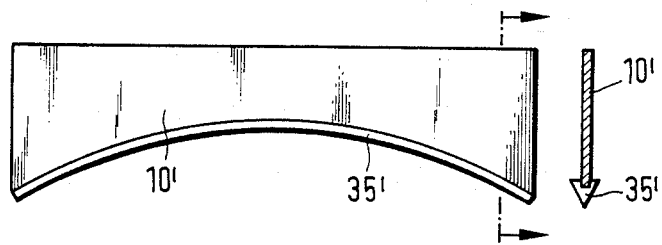
FIG. 6 is an embodiment of a cutting blade useful in the apparatus particularly for dividing hard types of cheese enclosed with a rind, and the blade is shown in an elevational view and in section, note the sectional line.

FIGS. 5 and 6 show two different embodiments of a cutting blade 10, 10' which can be used in the apparatus.

In FIG. 5, the downwardly directed cutting edge 35 of the blade 10 has an arrowhead-like shape with the centerpoint on the blade leading in the cutting direction. The cutting edge of the blade is formed with a plurality of pointed teeth 36. Unlike a saw-tooth blade, the teeth 36 are not dihedral. The teeth 36 are arc-shaped with converging tooth flanks and are similar to shark teeth.

In FIG. 6, the blade 10' has a concavely shaped cutting edge 35'. The cutting edge, as is shown in section, is triangularly shaped and, due to its concave configuration, unlike the blade in FIG. 5 where the centerpoint of the blade leads in the cutting direction, in FIG. 6 the opposite ends of the cutting blade lead the remainder of the cutting edge in the cutting or dividing operation.

With the special shape of the blades 10, 10', as distinguished from rectilinear cutting edges, initially the cutting pressure is concentrated in one or several locations so that, in a surprising manner, for the first time with the present invention it is possible to cut and separate the rinds on hard types of cheese.

It has been found that the cutting forces needed to divide a hard cheese, are applied to the cutting elements as shown in FIGS. 5 and 6 so that only a fraction of the forces are needed as compared to the forces required when a smooth rectilinear cutting edge is employed.

As shown in FIG. 5, the apparatus 22 is compact as well as simple. Therefore, it is well suited for problem-free use in a retail store and fulfills, in an ideal manner, the task for which the present invention is intended.

While specific embodiments of the invention have been shown and described in detail to illustrate the application of the inventive principles, it will be understood that the invention may be embodied otherwise without departing from such principles.

I claim:

1. An apparatus for dividing a unit of cheese, such as a medium-hard or hard type cheese in the form of a wheel or block of cheese, into smaller individual pieces, comprising a mechanical cutting device including a plurality of cutting edges, wherein the improvement comprises that said cutting device includes a rigid frame extending in a generally horizontal first plane, a plurality of knife-like blades each having one of said cutting edges and said blades are mounted in said frame, at least certain of said blades disposed in spaced parallel relation, said blades disposed in planes extending approximately perpendicular to said first plane, a support element, means to move said support element toward and relative to said frame between a first position located below said knife-like blades and a second position above said knife-like blades, said support element having a surface extending generally parallel to the first plane of said frame and divided into a plurality of separate support parts, each said support part having peripheral edges in the plane of said surface corresponding to the shape of one of the individual pieces of cheese to be cut by said cutting device, adjacent said support parts being disposed in separate closely spaced relation and forming slots therebetween sufficient to afford passage through said slots of said blades during movement of said support element between the first and second positions, a base plate in generally parallel relation with and spaced downwardly from said surface, and spaced upwardly extending supporting elements extending between and interconnecting each of said support parts and said base plate and said supporting elements being dimensioned in the upward direction so that the distance between said surface and said base plate is sufficient to receive said knife-like blades below said surface in the second position of said support element.

2. An apparatus, as set forth in claim 1, wherein said cutting device includes a base member located generally parallel to the surface of said support element and below said base plate, a plurality of rigid guide elements supported on and extending perpendicularly upwardly from said base member, a support table arranged in parallel relation with the surface of said support element below said base plate and being movably guided on said guide elements, said support element is replaceably mounted on said support table, and said cutting device being replaceably mounted on the ends of said guide elements spaced upwardly from said base member, and quick fastening elements securing said cutting device to said guide elements.

3. An apparatus, as set forth in claim 2, wherein slots are formed in the ends of said guide elements mounting said cutting device, and said quick-fastening elements comprise wedges inserted through said frame into said slots.

4. An apparatus, as set forth in claim 2, wherein the means to move the support element includes a hydraulic piston-cylinder unit movably supporting said support element for moving said support element between the first and second positions.

5. An apparatus, as set forth in claim 1, wherein said knife-like blades have a length dimension extending in the direction across said frame and a height dimension extending in the direction perpendicular to said first plane of said rigid frame, and the height of said blades increases along the length dimension toward the center of said blade spaced from the ends thereof.

6. An apparatus, as set forth in claim 1, wherein said knife-like blades have a length dimension extending in the direction across said frame and a height dimension extending in the direction perpendicular to said first plane of said rigid frame, and the height of said blades decreases along the length dimension toward the center of said blades spaced from the ends thereof.

7. An apparatus, as set forth in claim 5, wherein said blade is formed along the length thereof of a plurality of pointed arcuately shaped teeth.

8. An apparatus, as set forth in claim 6, wherein said blade has a cutting edge extending in the length dimension thereof and said cutting edge being approximately triangular in cross-section.

9. An apparatus, as set forth in claim 2, wherein said rigid frame being rectangularly shaped in said first plane and said frame having conically shaped bores therein, each of said guide elements being conically shaped at the ends thereof spaced from said base member and said ends being shaped complementary to said conically shaped bores in said frame so that said frame interengages with the conically shaped ends of said guide elements.

* * * * *